July 4, 1944.  S. S. LA SHA ET AL  2,353,112
AIRCRAFT HEATER
Filed Dec. 12, 1940    2 Sheets-Sheet 1
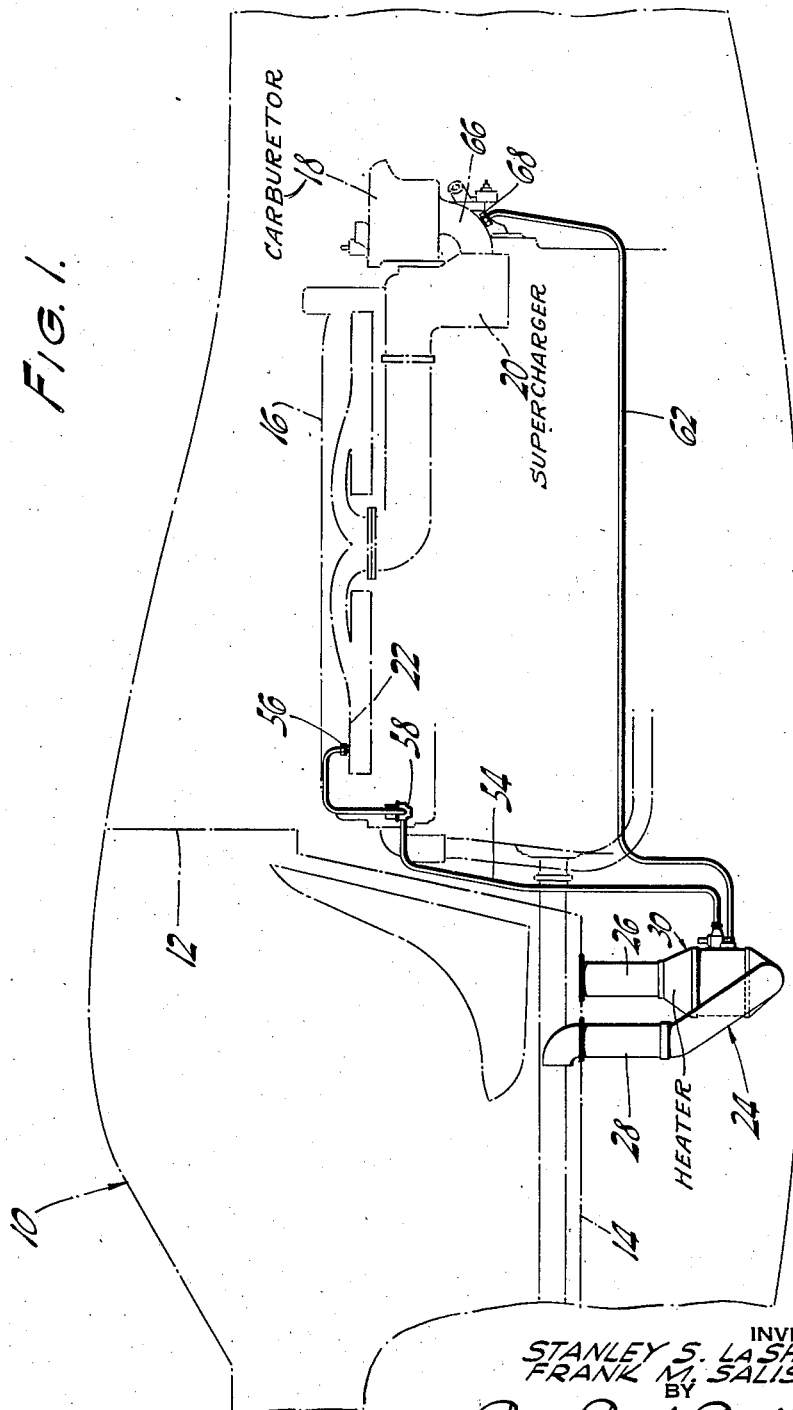
INVENTORS
STANLEY S. LA SHA AND
FRANK M. SALISBURY
BY
Bean, Brooks, Buckley & Bean.
ATTORNEYS

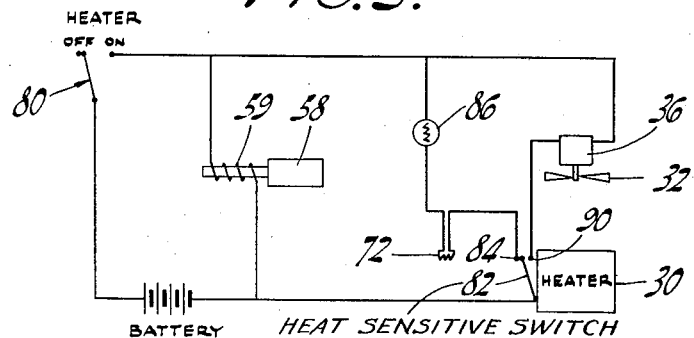
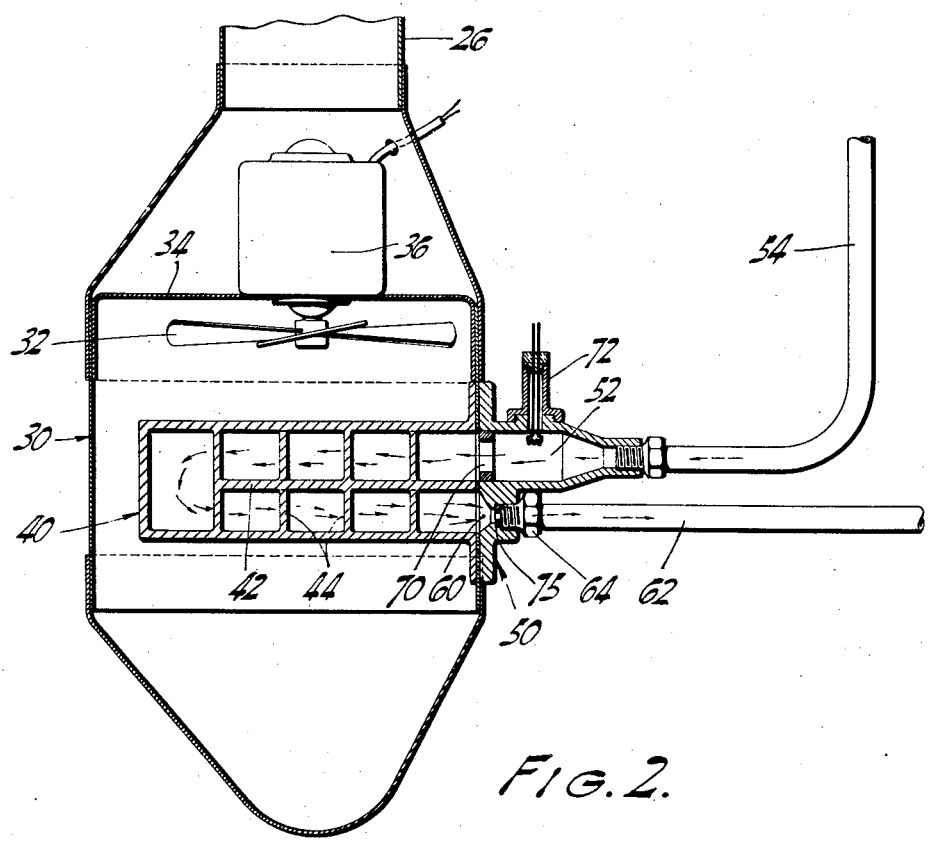

Patented July 4, 1944

2,353,112

UNITED STATES PATENT OFFICE 2,353,112

AIRCRAFT HEATER

Stanley S. La Sha and Frank M. Salisbury, Kenmore, N. Y., assignors to Bell Aircraft Corporation, Buffalo, N. Y.

Application December 12, 1940, Serial No. 369,828

2 Claims. (Cl. 237—12.3)

This invention relates to aircraft heaters, and more particularly to devices adapted to efficiently heat closed compartments of aircraft, or the like, when operating at relatively high altitudes. More specifically the invention relates to a combustion type of heater taking its supply of fuel from the fuel mixing apparatus of the aircraft engine.

One of the objects of the invention is to provide a heater of the character described which is adapted to utilize fluid pressure differential conditions at opposite points in the system in an improved manner to provide propulsion of fluid fuel into the heat exchange portion thereof. Another object is to provide a heater of the character described which is adapted to function in an improved manner and effectively under relatively high altitude conditions. Another object of the invention is to provide a simplified automatic control system for a heater apparatus having the above described capabilities. Other objects and advantages of the invention will appear from the specification hereinafter.

We are aware that combustion type heaters have been previously devised which operate upon the principle of vapor fuel circulation into the combustion chamber as the result of connecting the discharge portion of the combustion chamber to a conduit which is under reduced pressure or partial vacuum. In such cases the fuel is taken from the fuel mixing device subjected to surrounding atmospheric pressures. Hence, such types of heaters will operate successfully at relatively low altitudes as in connection with normal automobile use whenever the discharge portion of the combustion chamber is connected in open communication with the automobile intake manifold or some other suitable source of partial vacuum. However, such heater and fuel circulating systems, while being generally satisfactory for use in connection with automobiles and other low-altitude operating vehicles are entirely unsatisfactory and ineffectual at higher altitudes such as those at which modern airplanes operate. The present invention, therefore, contemplates a method and means for introduction of vapor or other fluid fuel into the combustion chamber of the heat exchange apparatus in accord with a distinctly different principle of operation, whereby the fuel supplying system of the heater apparatus is adapted to provide an ample fuel under all operating conditions and at altitudes up to the absolute ceiling of the airplane with which the heater is associated.

In the drawings:

Fig. 1 is a fragmentary schematic side elevation of an airplane fuselage and engine showing a heater of the invention in association therewith;

Fig. 2 is an enlarged sectional view of the heat exchange portion of the apparatus of the invention; and Fig. 3 is a wiring diagram of the control mechanism thereof.

The drawings illustrate the invention in association with an airplane fuselage designated generally by the numeral 10 having a passenger compartment wall 12 and floor 14. The airplane engine is indicated at 16 and is equipped with a carburetor 18 and a supercharger blower indicated at 20; the blower 20 being located between the carburetor 18 and the engine fuel intake manifold indicated at 22. The heater, indicated generally by the numeral 24 is located below the compartment floor 14 and is arranged to take relatively cold air through a conduit 26 and to discharge the heated air into the compartment through means of a conduit 28; but it will be understood that in lieu of the arrangement illustrated herein the heat exchange portion of the apparatus may be located at any other desired position in the airplane.

As better shown in Fig. 2, the heat exchange element of the apparatus comprises a box-like casing 30 arranged in open communication at its upper end with the air intake conduit 26 and at a lower end portion thereof in open communication with the heated air discharge conduit 28. A fan 32 is mounted within the interior of the casing 30 upon a suitable bracket 34 and is operatively coupled with a motor 36 to provide positive circulation of air from the intake conduit 26 through the casing 30 and thence into the discharge conduit 28. The control means for the motor 36 and the method of its functioning will be explained more fully hereinafter.

The heating element of the device is illustrated in Fig. 2 as comprising a combustion chamber 40 of elongate form disposed substantially transversely of the interior of the casing 30 and in the path of movement of air therethrough. The chamber 40 is in the form of a hollow case provided with a central horizontal partition 42 so as to provide a generally U-shaped passageway for hot gases therethrough as indicated by the arrows of the drawings. Vertical baffles 44 are shown as being disposed part way across the path of hot gas flow through the chamber from alternate sides thereof, and the hot gases are thus caused to flow through the chamber in a tortuous path so as to provide increase opportunity for heat exchange action. The combustion chamber 40 is mounted against a perforated side wall portion of the casing 30, and a header member 50 is mounted at the opposite side of the casing wall so as to be in open communication with the interior of the combustion chamber, thus providing a completely enclosed unit.

The header member 50 is formed with an ignition chamber 52 arranged in open communication with the portion of the combustion chamber interior disposed above the partition 42, and a fuel inlet conduit 54 is mounted in connected relation with the interior of the ignition chamber 52 so as to be adapted to conduct heater fuel into the ignition chamber. The conduit 54 is connected at its other end in communication with the interior of the engine intake manifold 22 through means of a suitable connection device 56. A valve 58 is disposed in the line of the conduit 54 for control of passage of fuel vapor through the heater feed conduit.

The header member 50 is also provided with a discharge chamber 60 disposed in open communication with the interior of the combustion chamber 40 below the partition 42 thereof so as to be adapted to receive the gases issuing from the combustion chamber subsequent to circulation therethrough. A gas discharge conduit 62 is connected in open communication with the chamber 60 by means of a suitable connection nipple device 64, and the conduit 62 is illustrated in Fig. 1 as leading into open communication with the engine feed conduit 66 extending from the engine carburetor 18 to the engine supercharger blower 20. The conduit 62 is shown as being connected to the conduit 66 by means of a connection device 68.

A fuel igniter 70 in the form of an annulus of refractory material is mounted in the fuel passageway between the ignition chamber 52 and the combustion chamber 40, and a starting igniter 72 in the form of an electrical resistance wire is mounted upon the header 50 in such manner as to extend into the path of the fuel-air vapor mixture taken by the conduit 54 from the engine manifold 22 as it passes through the ignition chamber 52. The igniter wire 72 is connected in series with a source of electrical energy as will be more fully explained hereinafter and is so formed as to be adapted to become sufficiently heated by passage of an electrical current therethrough to provide for ignition of the fuel mixture vapor entering the combustion chamber.

As illustrated by Fig. 3, the control mechanism for the heat exchange apparatus of the invention includes an electrical circuit deriving energy from a battery as indicated, or any other suitable power source. A pair of conductors extend from opposite terminals of the power source and one of the conductors leads to the movable element of a manually operable off-on switch indicated at 80. The switch 80 is preferably located in the airplane cabin within convenient reach of the pilot. The other conductor leading from the power source extends into connected relation with a bi-metallic cantilever arm 82 which is mounted upon the casing structure and is so formed as to bear, under normal temperature conditions, in electrically contacting manner at its unfixed end portion against a contact element 84 from which a conductor leads into operative connection with one end of the resistance wire element of the starting igniter 72. The opposite end of the igniter wire element is connected in series to a signal lamp 86 and from thence by means of a conductor into connection with a fixed contact element of the switch 80. Hence, whenever the switch 80 is adjusted to heater-on position the circuit through the igniter 72 and the signal lamp 86 is initially closed.

Conductors leading to the winding of a solenoid device 59 are shunted across the circuit leading to the igniter and signal lamp devices, and the armature of the solenoid device 59 is operatively associated with the fuel control valve 58 of the fuel inlet conduit 54 in such manner that the latter is actuated by the solenoid device to valve-open position whenever the heater switch 80 is in heater-on position. Thus, upon closing of the switch 80 subsequent to a period of non-operation, the solenoid 59 causes the valve 58 to be opened to permit passage of fuel vapor from the intake manifold 22 through the conduit 54 into the ignition chamber 52, and thence through the combustion chamber 40 and into the discharge conduit 62 leading to the engine fuel feed system. It will be understood that this mode of vapor fuel movement through the heater and conduit system will be automatically provided by reason of the difference between the pressures existing in the conduit system at the point of fuel intake connection 56 and at the point of discharge into the conduit 62.

As fuel vapor moves into the conduit system as described hereinabove upon opening of the valve 58, the vapor passes adjacent the starting igniter 72 (which is then energized) and is thereby ignited. The resulting flame passes into the combustion chamber 40 through the igniter orifice 70, and the latter is thereby heated to a temperature sufficient to enable it to function to provide continuous ignition of the following stream of fuel vapor conducted into the combustion chamber. During this initial combustion period the temperature of the heat exchange structure of the apparatus will also be raised to a temperature sufficient to provide transmission of heat to the bi-metallic element 82 in such manner as to cause it to become deformed and to lower its free end portion out of contact with the contact member 84 and into contact with a contact member 90 from which a conductor leads to the fan motor 36 and from thence into connection with the conductor leading to the fixed contact element of the switch 80.

Thus, upon attainment of operative temperatures within the heater structure the circuit through the starting igniter 72 is automatically opened and the fan 32 is automatically brought into operation so as to produce circulation of air through the intake conduit 26 and against the combustion chamber case 40, and thence through the outlet conduit 28 into the airplane cabin. It will also be understood that the signal lamp 86 will provide a visible indicator at all times whenever the starting igniter 72 is in operation, and that the lamp 86 will automatically extinguish whenever the electrical circuit through the igniter 72 is opened.

To stop the heater operation, it is only necessary that the pilot move the switch 80 to heater-off position, whereupon the circuit to the solenoid controlled valve 58 will be opened so as to cause the valve to return to closed position. Simultaneously, the circuit through the fan motor 36 will be opened to discontinue supply of power to the fan. Upon subsequent cooling of the heater structure the bi-metallic arm 82 will then return of its own accord to the position of Fig. 3, whereby the circuit through the starting igniter will be readjusted preparatory to subsequent re-commencement of the heater igniter operation in the manner described hereinabove. It will be appreciated that in event the fuel supply conduit 54 between the engine manifold and the heater becomes accidentally cut, as by a shot during combat, the supply of fuel vapor to the combustion chamber will be discontinued and the temperature thereof will thus lower to such a point that the bi-metallic arm 82 will disconnect from the contact 90 and reconnect with the contact 84. Thus the fan will stop and the signal lamp 86 will be energized to warn the pilot of the disruption to the system, so that he may open the switch 80 to cause the valve 58 to close.

As a result of experiments we have found that it is to be preferred to provide against too rapid removal of the fuel vapor and products of combustion from the combustion chamber 40, and for this purpose we prefer to provide a restriction in the line of the discharge conduit 62. For example, a perforated disc 75 may be disposed at the point of seating of the connection nipple 64 in the header 50; the disc 75 being formed with a small central opening so as to permit flow of gases therethrough at a predetermined reduced rate. Consequently, the fuel vapor is caused to flow through the inlet conduit 54 under the pressure created by the blower 20, and the combustion process takes place in the combustion chamber under substantial pressure conditions and in such manner that the flame of combustion is retarded with respect to passage out of the combustion chamber by the metering disc 75 so as to remain in useful heat exchange contact within the heat exchange portion of the system in an improved manner. Thus, increased heat exchange efficiency is obtained in connection with positive fuel feeding action under all operating conditions of the airplane and without regard to the altitude at which the airplane is operating, up to the absolute ceiling altitude of the airplane engine.

Thus, it will be understood that the positive pressure condition generated within the intake manifold 22 of the airplane engine in response to operation of the blower 20 is at all times considerably in excess of the atmospheric pressure externally of the airplane fuel feed system and of the pressure within the engine fuel conduit 66. Consequently, the fuel vapor is introduced into the conduit 54 of the heater system and is induced to flow into the combustion chamber 40, while the products of combustion or other discharge gases are similarly induced to flow out of the combustion chamber through the discharge conduit without other assistance. It will be appreciated that the heater vapor circulating system and the engine fuel feed system combine to provide a closed fluid handling system which is separated from the atmosphere externally of the airplane. Consequently, the functioning of the heater apparatus of the invention is uniform and effective throughout all operating ranges of the aircraft, and it is therefore seen that the present invention clearly distinguishes from devices of the prior art such as provide for induction of fuel flow into the combustion chamber by means of operative connection with partial vacuum sources such as the intake manifold of a standard type internal combustion engine. In such cases the apparatus is entirely unsuited to operation at substantial altitudes such as at which modern airplanes are called upon to operate. For example, a heater of this type of the prior art has been tested for possible use as an airplane accessory and it ceased operation at altitudes around seven to ten thousand feet above sea level. As distinguished from the above, the apparatus of the invention is adapted to function at altitudes up to twenty thousand feet above sea level with facility equal to that of its operation at sea level. As the altitude increases above twenty thousand feet the pressure differential of the system slowly decreases and approaches zero as the absolute ceiling of the airplane is reached. Consequently, the apparatus is effective for all practical purposes under all operating conditions to be met with in connection with the use of the airplane.

In another form of the invention the conduit 62 may be arranged to direct the heater discharge gases into the atmosphere externally of the airplane engine fuel intake system. In such case we prefer that the outer terminal of the conduit 62 be arranged in connection with a Venturi tube device disposed in the airstream surrounding the airplane fuselage in such manner that an additional pressure differential will thereby be generated to assist in the induction of fuel flow through the heat exchange system.

Although the invention has been illustrated and described hereinabove in an exemplary manner only, it will be understood by those skilled in the art that the invention is not so limited but that various changes may be made therein without departing from the spirit of the invention or the scope of the appended claims.

We claim:

1. In a heating system for use in conjunction with an internal combustion engine receiving a compressed combustible mixture of fuel and air from a supercharger having an inlet and an outlet, the combination of an internal combustion heater, a conduit for supplying combustible mixture to said heater from said outlet, and a conduit for discharging the products of combustion from said heater into said inlet, whereby the differential pressure created by said supercharger will cause combustible mixture to flow to said heater, and the products of combustion to flow therefrom.

2. In a heating system for use in conjunction with an internal combustion engine having a supercharger compressing a combustible mixture of fuel and air, the combination of an internal combustion heater having a combustion chamber and a heat exchanger receiving the products of combustion therefrom, a duct for supplying combustible mixture to said combustion chamber from a point at which combustible mixture has been compressed by said supercharger, and a duct for conveying said products of combustion from said heat exchanger to a point where combustible mixture is maintained at a pressure less than at said first-named point by the action of said supercharger.

FRANK M. SALISBURY.
STANLEY S. LA SHA.